United States Patent [19]

Kakiuchi

[11] Patent Number: 5,155,635
[45] Date of Patent: Oct. 13, 1992

[54] LIGHT ADMITTING DEVICE
[75] Inventor: Shinichi Kakiuchi, Tokyo, Japan
[73] Assignee: Asahi Kogaku Kogyo K.K., Tokyo, Japan
[21] Appl. No.: 676,510
[22] Filed: Mar. 28, 1991
[30] Foreign Application Priority Data
  Apr. 9, 1990 [JP] Japan .................. 2-93802
[51] Int. Cl.$^5$ ............................ G02B 27/00
[52] U.S. Cl. ................... 359/896; 359/707; 362/31; 362/109
[58] Field of Search ............... 359/896, 892, 885, 884, 359/707, 720, 798, 894; 362/30, 31, 28, 29, 109

[56] References Cited

U.S. PATENT DOCUMENTS

| | | | |
|---|---|---|---|
| 3,506,355 | 4/1970 | Nagel | 359/798 |
| 3,588,492 | 6/1971 | Pollock | 359/707 |
| 3,988,057 | 10/1976 | Kapany et al. | |
| 4,059,916 | 11/1977 | Tachihara et al. | 362/31 |
| 4,257,084 | 3/1981 | Reynolds | 362/31 |
| 4,648,690 | 3/1987 | Ohe | 359/896 |
| 4,893,222 | 1/1990 | Mintzer | 362/109 |

FOREIGN PATENT DOCUMENTS

| | | |
|---|---|---|
| 0171888 | 3/1988 | European Pat. Off. . |
| 269428 | 4/1961 | Fed. Rep. of Germany . |
| 2827573C2 | 2/1983 | Fed. Rep. of Germany . |
| 3625767A1 | 2/1987 | Fed. Rep. of Germany . |
| 3907805A1 | 9/1990 | Fed. Rep. of Germany . |
| 4041803A1 | 7/1991 | Fed. Rep. of Germany . |
| 910410 | 11/1962 | United Kingdom . |

OTHER PUBLICATIONS

Japanese Patent Abstract 61-248924 (A) Nov. 5, 1986.
Japanese Patent Abstract 1-72125 (A) Mar. 17, 1989.
Japanese Patent Abstract 1-281401 (A) Nov. 13, 1989.
Japanese Patent Abstract 1-11202 (A) Apr. 28, 1989.
Japanese Patent Abstract 63-206701 (A) Aug. 26, 1988.
Japanese Patent Abstract 62-902(A) Jan. 6, 1987.

*Primary Examiner*—Loha Ben
*Attorney, Agent, or Firm*—Sughrue, Mion, Zinn, Macpeak & Seas

[57] ABSTRACT

A device for admitting light into a photodetecting apparatus such as an automatic white balance sensor includes a light-diffusing plate having a light admitting face for receiving light and a light issuing face from which diffuse light emerges. A reflecting layer is formed on at least a surface of the light-diffusing plate which is opposite the light admitting face.

23 Claims, 2 Drawing Sheets

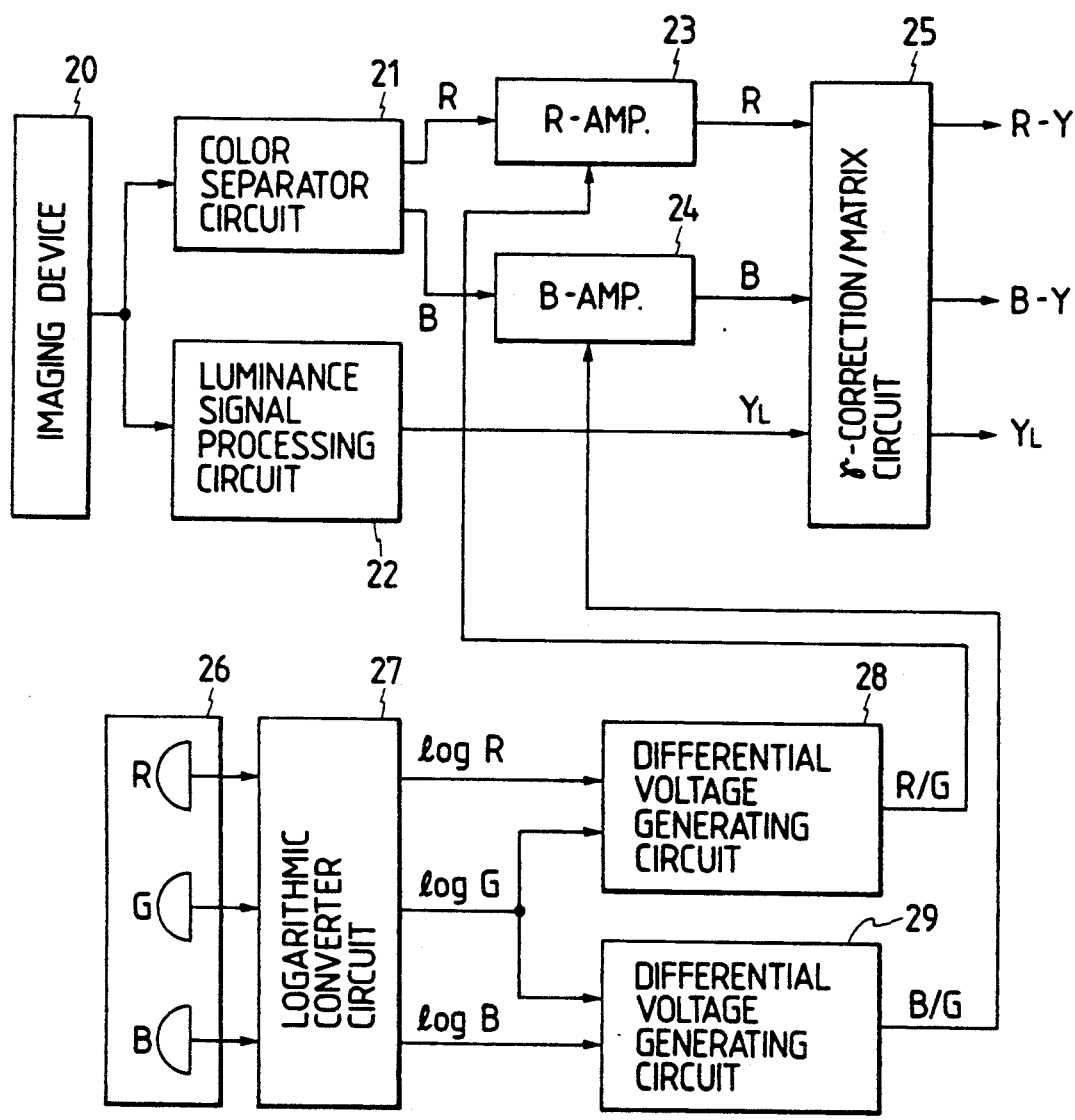

LIGHT ADMITTING DEVICE

BACKGROUND OF THE INVENTION

This application is based on and claims priority from Japanese Patent Application Hei. 2-93802, filed Apr. 9, 1990, the disclosure of which is incorporated by reference herein.

This invention relates to a light-admitting device and, more particularly, relates to a light-admitting device suitable for use in a photodetecting apparatus such as a white balance sensor.

Automatic white balance sensors used in electronic still cameras and other imaging apparatus are adapted to operate in the following way. The ratios of respective light components, i.e., R (red), G (green) and B (blue) components, obtained through an RGB filter assembly provided on the light-receiving surface are detected and the resulting detection signals (e.g. R/G and B/G) are used to control the gains of amplifier circuits for color signals contained in the video signal output from the imaging device in such a way that the image of a white object will be reproduced white under any kind of light source, thereby achieving optimal color reproduction in accordance with the color temperature of a light source.

FIG. 3 is a typical circuit diagram for electronic still cameras and other imaging apparatus that are adapted to achieve color reproduction associated with various color temperatures. The circuit shown in FIG. 3 includes an imaging device 20 typically formed of a CCD, a color separator circuit 21 for extracting red (R) and blue (B) primary color signal from each video signal from the imaging device 20, and a luminance signal processing circuit 22 for separating a luminance signal $Y_L$ from each video signal from the imaging device 20. The R and B signals issuing from the color separator circuit 21 are amplified by associated amplifier circuits 23 and 24 and are respectively supplied into a γ-correction/matrix circuit 25. The luminance signal $Y_L$ issuing from the luminance signal processing circuit 22 is also supplied into the γ-correction/matrix circuit 25. The circuit 25 outputs two color-difference signals, R-Y and B-Y, as well as the luminance signal $Y_L$, all of which serve to generate an NTSC color television signal.

Shown by 26 in FIG. 3 is an automatic white balance sensor which outputs R, G and B signals associated with respective color temperatures. Those signals are converted to logarithmic values by means of a logarithmic converter circuit 27. Of the three logarithmic signals, those for log R and log G are supplied to a first differential voltage generating circuit 28 which constructs an R white balance control voltage R/G from the differential voltage for the two input signals. The logarithmic signal for log B from the converter circuit 27 is supplied together with the signal for log G to a second differential voltage generating circuit 29 which constructs a B white balance control voltage B/G from the differential voltage for the two input signals.

The two control voltages R/G and B/G thus produced from the differential voltage generating circuits 28 and 29 are fed into the associated R and B amplifier circuits 23 and 24, and the gains of the respective amplifiers are controlled in such a way that the image of a white object will be produced white under any kind of light source.

The white balance sensor used in the system described above must be so designed that the RGB light-receiving region is illuminated uniformly irrespective of the angle of incidence of light falling on that region. In the prior art, the combination of a light-diffusing plate filter and a luminosity compensating filter has been provided on the light-receiving surface of the sensor so that uniform illumination will occur in the RGB light-receiving region. However, in the prior art automatic white balance sensor having the construction described above, the light-receiving surface of the light-diffusing plate is parallel and in proximity to that of the sensor, and any change in the angle of incidence of light falling on the diffusing plate or any directivity of the incident light will directly affect the light-receiving surface of the sensor so that it will not be illuminated uniformly with the incident light.

Particularly, in the case where the RGB color filter assembly provided on the light-receiving surface of the sensor is a striped type, uneven illumination occurs on the light-receiving surface if incident light is admitted sideways, i.e., in a direction normal to the stripes. One may consider increasing the thickness of the light-diffusing plate in order to achieve even illumination, but then less light is admitted by the light-receiving surface of the sensor and the level of the output from the automatic white balance sensor will decrease to make it highly susceptible to external noise.

SUMMARY OF THE INVENTION

The present invention is directed to overcoming the problems discussed above, and it is an object of the invention to provide a light-admitting device capable of producing uniform and intense output light.

This and other objects are achieved by a light-admitting device comprising: a light-diffusing member having a light-admitting face provided on its relatively wide surface, and a light-issuing face from which diffuse light emerges and which is provided on a portion of a surface of the light-diffusing member developing in the direction of its thickness; and a reflecting layer provided on at least a surface of the light-diffusing member which is opposite the light-admitting face, for activating the internal diffusion of light.

In a preferred embodiment of the present invention, the surface of the light-diffusing member which is opposite its light-admitting face is inclined toward the light-issuing face.

In the device of the present invention, the light-issuing face of the light-diffusing member that faces the light-receiving surface of the automatic white balance sensor is provided on a surface of the diffusing member in the direction of its thickness to thereby increase the optical path length of light diffusion through that member. This contributes to improvement in the diffusivity of incident light, thereby permitting the light-receiving surface of the sensor to be uniformly illuminated with outgoing light from the issuing face of the diffusing member.

Further, the reflecting layer activates the light diffusion due to multiple reflections and scattering in the light-diffusing member, thereby increasing the intensity of light incident on the light-receiving surface of the sensor.

As a result, even if the angle of incidence of light falling on the light-admitting face of the diffusing member changes or even if the incident light has directivity, the light-receiving surface of the sensor will be uniformly illuminated with the incident light and its intensity is sufficiently enhanced to produce a stable sensor output that is immune to external noise.

If the surface of the light-diffusing member which is opposite its light-admitting face is inclined toward the light-issuing face, the intensity of incident light on the light-receiving surface of the sensor can be further improved.

BRIEF DESCRIPTION OF THE DRAWINGS

The invention will be more clearly understood from the following description in conjunction with the accompanying drawings, wherein:

FIG. 3 is a typical circuit diagram for electronic still cameras and other imaging apparatus.

DESCRIPTION OF THE PREFERRED EMBODIMENT

Figure 1:
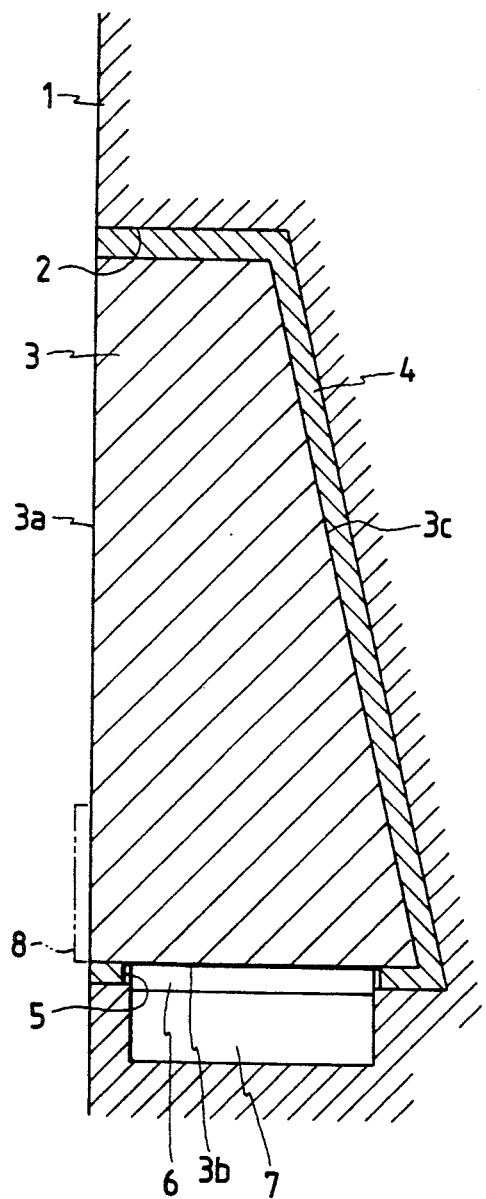
FIG. 1 is a cross section of a light-admitting device according to an embodiment of the present invention.

A preferred embodiment of the invention is illustrated in FIG. 1, wherein 1 is a support housing, 2 is a recess formed in the front wall of the housing 1, and 3 is a light-diffusing plate fitted in the recess 2. The light-diffusing plate 3 is shaped from a suitable material such as milk-white acrylic resin. The front part of this plate may be a square 10 mm long on each side, and both lateral sides of the plate have a trapezoidal shape. The bottom of the plate 3 has a thickness of approximately 5 mm (the width direction as viewed in FIG. 1), and its top has a thickness of about 2 mm.

The vertical front surface of the light-diffusing plate 3 having this shape serves as a light-admitting face 3a, and the bottom of the plate is provided in the direction of its thickness with a light-issuing face 3b (which is a square approximately 3 mm long on each side) from which diffuse light emerges.

Figure 2:
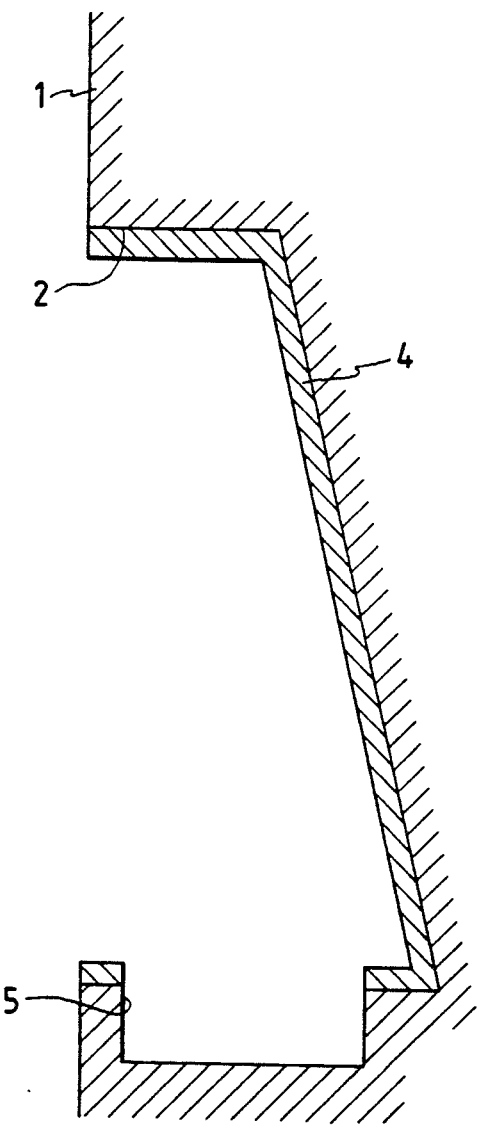
FIG. 2 is a cross section of a support housing which is covered with a light reflecting layer.

All sides of the light-diffusing plate 3 except the light-admitting face 3a and part of the bottom where the light-issuing face 3b is provided, as well as an inclined back surface 3c, are covered with a reflecting layer 4 formed by a suitable technique such as aluminum evaporation. Alternatively, as shown in FIG. 2, a reflecting layer 4 may be formed in advance on surfaces of the support housing 1 in place of the above surfaces of the light-diffusing plate 3. Note that the back surface 3c lies in a plane which is transverse to, i.e., it crosses, the planes of the light-admitting face 3a and light-issuing face 3b.

A light-transmitting window 5 is formed in that area of the housing 1 which faces the light-issuing face 3b, and an automatic white balance sensor 7 is provided in the window 5, with a luminosity-compensating filter 6 being interposed. The filter 6 compensates for the spectral characteristics of diffuse light passing through the plate 3 and achieves spectral matching between the imaging device and the automatic white balance sensor 7.

In the embodiment described above, external light admitted into the diffusing plate 3 through the face 3a undergoes repeated multiple reflections and scattering due to the milk-white particles in the plate 3, as a result of which the light diffuses through the plate 3 toward the light-issuing face 3b. The light reaching the reflecting layer 4 is reflected inward, whereby the multiple reflections and scattering of light within the plate 3 are further complicated and activated to increase the diffusivity of the incident light. Further, the inclined back face 3c which is opposite the light-admitting face 3a permits the reflected light to be positively directed toward the light-issuing face 3b.

Because of this arrangement, even if the light admitted to the face 3a is directional or has its angle of incidence varied, it will be converted to substantially uniform diffuse light and travels toward the face 3b, from which the light issues in a quantity that is sufficiently uniform across the face 3b to accomplish uniform illumination in the entire part of the light-receiving surface of the automatic white balance sensor 7.

The light-issuing face 3b is on the bottom of the diffusing plate 3 in the direction of its thickness which is vertical to the light-admitting face 3a, so that the optical path length of light diffused through the plate 3 is increased to provide enhanced diffusivity. Further, the reflecting layer 4 formed on the back face 3c which is inclined toward the light-issuing face 3b helps increase the light flux emerging from the face 3b, thereby enhancing the intensity of light incident on the light-receiving surface of the sensor.

As a further advantage, the surface area of the light-admitting face 3a can be sufficiently increased to enhance the intensity of incident light on the light-receiving surface of the sensor, whereby the level of output from the automatic white balance sensor 7 is increased to accomplish the sending of stable output signals that are immune to external noise.

The arrangement described above is also effective for making thinner the structure around the automatic white balance sensor 7.

If a light shielding layer 8 is provided in the lower part of the light-admitting face 3a which is near the light-issuing face 3b as indicated by a phantom line in FIG. 1, uneven illumination that would otherwise be caused by light admitted through the area near the face 3b can be prevented.

In the embodiment described above, the cross section of the diffusing plate 3 is in a trapezoidal form, but this is not a requirement and it may assume other shapes such as a rectangle or a segment of a circle. It should also be mentioned that the shape of the light-admitting face 3a need not be flat.

According to the invention disclosed herein, the optical path length of light diffusion in the device of the present invention is increased to enhance the diffusivity of incident light, so that uneven light diffusion can be eliminated to achieve uniform illumination of the light-receiving surface of the sensor. Further, the diffusion of light in the diffusing member can be sufficiently complicated and activated to enhance the intensity of light incident on the light-receiving surface of the sensor. As a further advantage, the intensity of light that is admitted to the light-receiving surface of the sensor can be further improved by adopting a design in which the face of the light-diffusing member which is opposite the light-admitting face is inclined toward the light-issuing face.

What is claimed is:

1. A light-admitting device, comprising:
   a light-diffusing member having a light-admitting face for receiving light, and a light-issuing face from which diffuse light emerges; and
   a reflecting layer provided on at least a first surface of said light-diffusing member which is opposite said light-admitting face, wherein the area of said light-admitting face is larger than the area of said light-issuing face.

2. A device according to claim 1, wherein said first surface is inclined toward said light-issuing face.

3. A device according to claim 1, wherein said reflecting layer is disposed over a portion of said light-issuing face.

4. A device according to claim 1, wherein said reflecting layer is disposed over at least portions of surfaces of said light-diffusing member extending in three different planes.

5. A device according to claim 1, wherein said reflecting layer is disposed over at least portions of surfaces of said light-diffusing member extending in four different planes.

6. A device according to claim 1, wherein said reflecting layer is disposed over at least portions of surfaces of said light-diffusing member extending in five different planes.

7. A device according to claim 1, further comprising a light-shielding member disposed over a portion of said light-diffusing member adjacent said light-issuing face.

8. The device according to claim 1, wherein said light-issuing face lies in a plane transverse to said light-admitting face.

9. The device according to claim 8, wherein said light-issuing face lies in a plane substantially perpendicular to said light-admitting face.

10. The device according to claim 1, wherein said light-diffusing member is made of a milk-white acrylic resin.

11. The device according to claim 1, wherein said light-admitting face receives ambient light.

12. A light-admitting device, comprising:
a light-diffusing member having a light-admitting face for receiving light, and a light-issuing face from which diffuse light emerges;
a support housing for enclosing said light-diffusing member, said support housing having a window for transmitting said diffuse light emerging from said light-issuing face; and
a reflecting layer provided between said light-diffusing member and said support housing so as to face at least a first surface of said light-diffusing member which is opposite said light-admitting face, wherein the area of said light-admitting face is larger than the area of said light-issuing face.

13. A device according to claim 12, wherein said reflecting layer is formed on said support housing.

14. A device according to claim 12, wherein said first surface is inclined toward said light-issuing face.

15. A device according to claim 12, wherein said reflecting layer faces a portion of said light-issuing face.

16. A device according to claim 12, wherein said reflecting layer faces at least portions of surfaces of said light-diffusing member extending in three different planes.

17. A device according to claim 12, wherein said reflecting layer faces at least portions of surfaces of said light-diffusing member extending in four different planes.

18. A device according to claim 12, wherein said reflecting layer faces at least portions of surfaces of said light-diffusing member extending in five different planes.

19. A device according to claim 12, further comprising a light-shielding member disposed over a portion of said light-diffusing member adjacent said light-issuing face.

20. The device according to claim 12, wherein said light-issuing face lies in a plane transverse to said light-admitting face.

21. The device according to claim 20, wherein said light-issuing face lies in a plane substantially perpendicular to said light-admitting face.

22. The device according to claim 12, wherein said light-diffusing member is made of a milk-white acrylic resin.

23. The device according to claim 12, wherein said light-admitting face receives ambient light.

* * * * *